(12) United States Patent
Gross et al.

(10) Patent No.: US 7,482,947 B2
(45) Date of Patent: Jan. 27, 2009

(54) CAMOUFLAGING BUSINESS-ACTIVITY INFORMATION IN A TELEMETRY SIGNAL THROUGH RANDOMIZATION

(75) Inventors: Kenny C. Gross, San Diego, CA (US); Keith A. Whisnant, LaJolla, CA (US); Ramakrishna C. Dhanekula, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 422 days.

(21) Appl. No.: 11/471,204

(22) Filed: Jun. 20, 2006

(65) Prior Publication Data

US 2008/0001777 A1  Jan. 3, 2008

(51) Int. Cl.
*H04K 3/00* (2006.01)
(52) U.S. Cl. .................. 340/870.01; 380/1; 380/252; 380/254
(58) Field of Classification Search .............. 380/1, 380/252, 255, 207, 206, 268, 210; 340/870.01
See application file for complete search history.

(56) References Cited

U.S. PATENT DOCUMENTS 5,297,201 A * 3/1994 Dunlavy .................. 380/252

* cited by examiner

*Primary Examiner*—Albert K Wong
*Assistant Examiner*—Hung Q Dang
(74) *Attorney, Agent, or Firm*—Park, Vaughan & Fleming LLP

(57) ABSTRACT

One embodiment of the present invention provides a system that camouflages business-activity information in telemetry signals from a computer system. During operation, the system monitors telemetry signals from the computer system to obtain a time series containing a telemetry metric which provides business-activity information. Next, the system computes a serial correlation between data values in the time series. The system then determines if the computed serial correlation between the data values in the time series is above a predetermined threshold level. If so, the system performs frequency domain analysis on the time series. The system then generates artificial activity on the computer system which causes the frequency spectra of the time series to reduce the serial correlation between the data values in the time series.

21 Claims, 3 Drawing Sheets

REAL-TIME TELEMETRY SYSTEM 100 ns-sensitive, these signals have not been generally considered to be confidential information. Consequently, such information can easily fall into the wrong hands, such as persons seeking financial gain in trading markets. Such persons, who can access this telemetry data, can come from both inside and outside of a company. For example, they can include employees, contractors, partners, interns, and hackers. Therefore, it is highly desirable to restrict access to this information by providing added business security to the telemetry signals.

CAMOUFLAGING BUSINESS-ACTIVITY INFORMATION IN A TELEMETRY SIGNAL THROUGH RANDOMIZATION

RELATED APPLICATION

The subject matter of this application is related to the subject matter in a co-pending non-provisional application by the same inventors as the instant application and filed on the same day as the instant application entitled, "Method and Apparatus for Camouflaging Business-Activity Information in a Telemetry Signal," having Ser. No. 11/471,203, and filing date Jun. 20, 2006.

BACKGROUND

1. Field of the Invention

The present invention relates to techniques for camouflaging business-activity information in telemetry signals from a computer system. More specifically, the present invention relates to a method and an apparatus that monitors telemetry signals and generates artificial activity in a computer system to camouflage business-activity information in the telemetry signals.

2. Related Art

Modern server systems are typically equipped with a significant number of sensors which monitor signals during the operation of the server systems. For example, these monitored signals can include temperatures, voltages, currents, and a variety of software performance metrics, including CPU usage, I/O traffic, and memory utilization. Outputs from this monitoring process can be used to generate time series data for these signals which can subsequently be analyzed to determine how well a computer system is operating.

However, some telemetry signals gathered from certain enterprise servers may contain business-activity information, which a company would not want its competitors or unauthorized persons to learn. More specifically, by looking at these telemetry time series traces, it is possible to discover the level of a company's business activities and to infer company's business performance well before the company's CFO even knows how the company is doing.

For example, an enterprise server which executes business transactions for a company, such as company's booking, billing and shipping transactions, can generate a variety of telemetry signals which contain operating-system-related metrics such as load on CPU, throughput, I/O traffic, and response times. These telemetry signals have been shown to exhibit similar dynamic profiles including: (1) five large daily humps during typical business weeks with low troughs at nights and on weekends; (2) growing peak heights through a quarter; and (3) lower peak heights at the beginning of a new quarter (well-known "hockey stick" profiles from business metrics).

Such business dynamics show up in the telemetry time series because business activities are often reflected in the above-described operating system related metrics, which can be directly or indirectly obtained from the associated telemetry signals.

Even though none of company's sensitive information is accessible through such telemetry data, the fact that some of the telemetry time series dynamics reflect a company's level of business activity may create potentially serious business risks. For example, if this information falls into the wrong hands and is misused for financial gain, it could result in people going to jail and/or monetary damages to the company's business.

Although some telemetry signals can be extremely business-sensitive, these signals have not been generally considered to be confidential information. Consequently, such information can easily fall into the wrong hands, such as persons seeking financial gain in trading markets. Such persons, who can access this telemetry data, can come from both inside and outside of a company. For example, they can include employees, contractors, partners, interns, and hackers. Therefore, it is highly desirable to restrict access to this information by providing added business security to the telemetry signals.

Hence, what is need is a method and apparatus for effectively camouflaging business-activity information in telemetry data without the above-described problems.

SUMMARY

One embodiment of the present invention provides a system that camouflages business-activity information in telemetry signals from a computer system. During operation, the system monitors telemetry signals from the computer system to obtain a time series containing a telemetry metric which provides business-activity information. Next, the system computes a serial correlation between data values in the time series. The system then determines if the computed serial correlation between the data values in the time series is above a predetermined threshold level. If so, the system performs frequency domain analysis on the time series. The system then generates artificial activity on the computer system which causes the frequency spectra of the time series to reduce the serial correlation between the data values in the time series.

In a variation on this embodiment, the telemetry metric can include: (1) load on a CPU; (2) I/O traffic; (3) memory utilization; and (4) storage read/write activity.

In a variation on this embodiment, the system generates the artificial activity by iteratively: (1) identifying a frequency F which has the lowest amplitude in the power spectral density (PSD) of the frequency spectra; (2) generating an artificial load in the computer system associated with the frequency F to reduce the serial correlation; (3) recomputing the serial correlation; (4) determining if the recomputed serial correlation is below the predetermined threshold level; and (5) if so, repeating the process for another frequency F which has the lowest amplitude in the PSD.

In a further variation on this embodiment, the system generates the artificial load associated with the frequency F by generating a series of load impulses at a time interval of $1/F$, which causes the amplitude of the frequency F in the PSD to increase to a predetermined constant level.

In a further variation on this embodiment, the system stores the frequency F in a first-in first-out (FIFO) buffer which has a predetermined buffer size prior to generating the artificial load in the computer system.

In a further variation on this embodiment, storing the frequency F in the FIFO buffer involves: (1) determining if the FIFO buffer is full; and (2) if so, removing the oldest frequency from the FIFO buffer, thereby making a space for the frequency F.

In a variation on this embodiment, the system computes the serial correlation by performing a Fisher-Kappa test, which computes the randomness of the time series.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Real-Time Telemetry System

Figure 1:
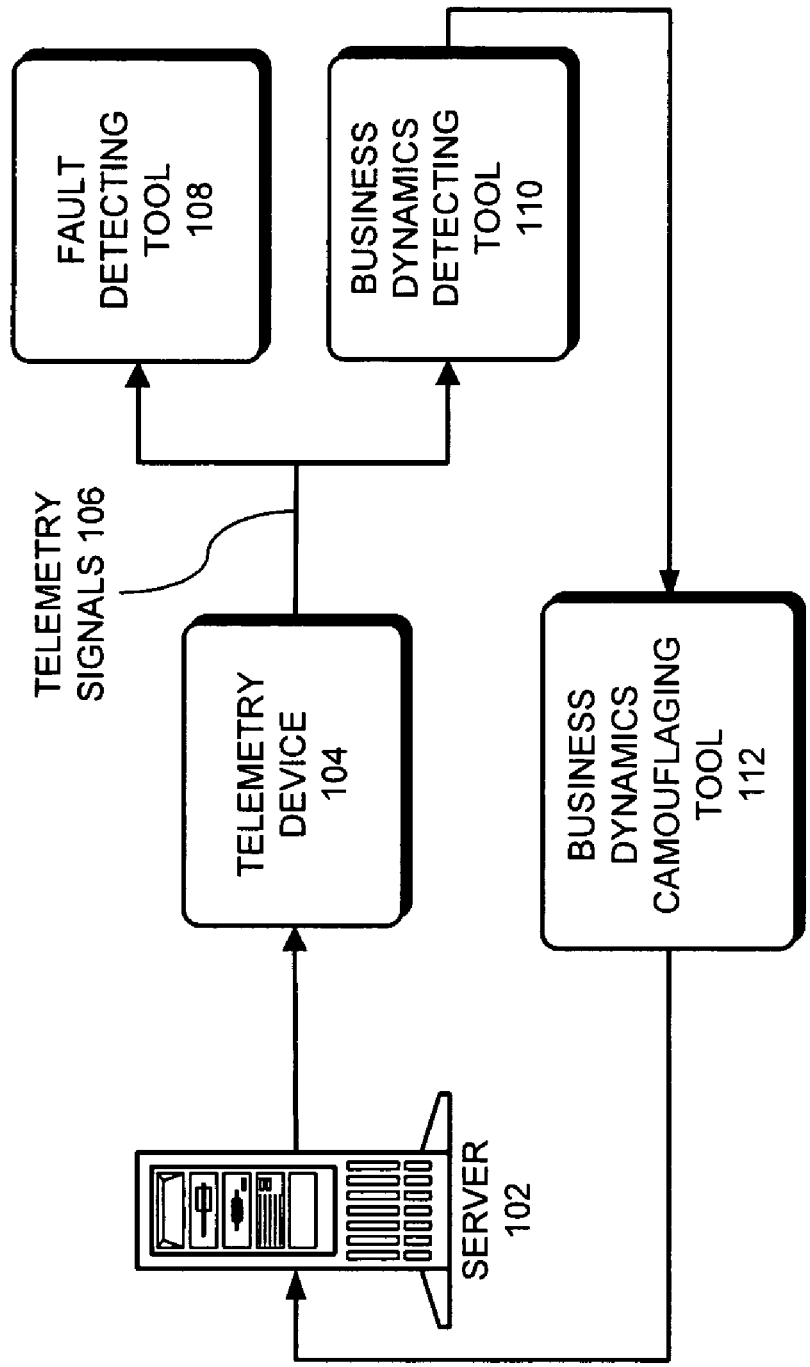
FIG. 1 illustrates a real-time telemetry system which facilitates camouflaging business-activity information in the telemetry signals in accordance with an embodiment of the present invention.

FIG. 1 illustrates real-time telemetry system 100 which facilitates camouflaging business-activity information in the telemetry signals in accordance with an embodiment of the present invention. Real-time telemetry system 100 contains server 102. Server 102 can generally include any computational node including a mechanism for servicing requests from a client for computational and/or data storage resources. In the present embodiment, server 102 is a uniprocessor or multiprocessor server that is being monitored by real-time telemetry system 100.

Note that the present invention is not limited to the computer server system illustrated in FIG. 1. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

Real-time telemetry system 100 also contains telemetry device 104, which gathers telemetry signals 106 from the various sensors and monitoring tools within server 102, and directs telemetry signals 106 to a local or a remote location that contains fault-detecting tool 108 and business-dynamic-detection tool 110.

Note that telemetry signals 106 gathered by real-time telemetry system 104 can include signals associated with physical and/or software performance parameters measured through sensors within the computer system. The physical parameters can include, but are not limited to: distributed temperatures within the computer system, relative humidity, cumulative or differential vibrations within the computer system, fan speed, acoustic signals, currents, voltages, time-domain reflectometry (TDR) readings, and miscellaneous environmental variables. The software parameters can include, but are not limited to: load metrics, CPU utilization, I/O traffic, idle time, memory utilization, disk activity, transaction latencies, and other performance metrics reported by the operating system.

Fault-detecting tool 108 monitors and analyzes telemetry signals 106 in real-time. Specifically, fault-detecting tool 108 detects anomalies in telemetry signals 106 and by analyzing telemetry signals 106, predicts probabilities of specific faults and failures in server 102. In one embodiment of the present invention, telemetry device 104 and fault-detecting tool 108 are both components of a Continuous System Telemetry Harness (CSTH). In one embodiment of the present invention, fault-detecting tool 108 performs a Sequential Probability Ratio Test (SPRT) on telemetry signals 106, wherein the SPRT provides a technique for monitoring noisy process variables and detecting the incipience or onset of anomalies in such processes with high sensitivity. Although shown to be outside server 102, telemetry device 104 and fault-detecting tool 108 can both be embedded in server 102 which is being monitored.

Business-dynamic-detecting tool 110 also monitors telemetry signals 106 in real-time. However, instead of looking for anomalies in telemetry signals 106, business-dynamic-detecting tool 110 detects specific dynamic behaviors in the time series of telemetry signals 106 which may be associated with business-sensitive information. If such dynamic behaviors are found in the time series, business-dynamic-camouflaging tool 112 generates artificial activity on server 102 to camouflage the dynamic behaviors in the time series of telemetry signals 106. Although shown to be outside server 102, business-dynamic-detecting tool 110 and business-dynamic-camouflaging tool 112 can both be embedded in server 102.

Note that in FIG. 1, the same telemetry signals 106 feed to both fault-detecting tool 108 and business-dynamic-detecting tool 110. Although FIG. 1 illustrates fault-detecting tool 108 and business-dynamic-detecting tool 110 operating in parallel, they can also operate in sequential order, such that fault-detecting tool 108 is placed before or after business-dynamic-detecting tool 110. Note that, because telemetry signals 106 can include both actual system activity from server 102 and the artificial activity created by business-dynamic-camouflaging tool 112, fault-detecting tool 108 is able to separate actual server activity in telemetry signals 106 from the artificial activity.

Note that in FIG. 1, server 102, telemetry device 104, business-dynamic-detecting tool 110, and camouflaging tool 112 effectively form a feedback and control loop which facilitates detecting and camouflaging business dynamics in telemetry signal 106.

Camouflaging the Telemetry Signals

The present invention camouflages business dynamics in time series of the telemetry signals by using the above-described telemetric feedback and control scheme. Specifically, the present invention determines the level of serial correlation between data values in the received time series, wherein a sufficiently high level of serial correlation may be used to infer business-activity information. The present invention subsequently reduces the level of serial correlation in the time series which camouflages the business dynamics in the telemetry data.

Figure 2:
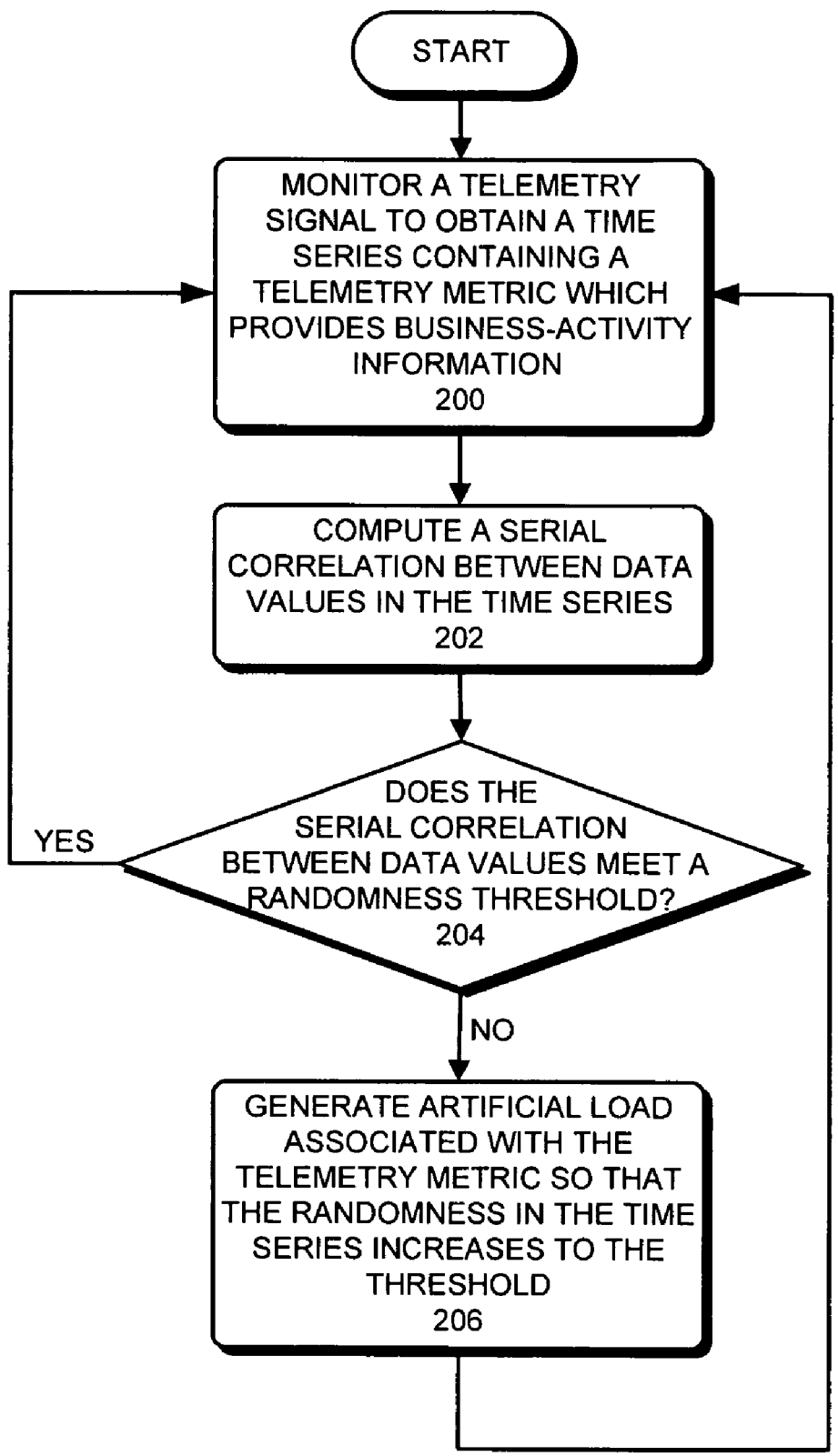
FIG. 2 presents a flowchart illustrating the process of camouflaging business-activity information in a telemetry metric by reducing serial correlation in the associated time series in accordance with an embodiment of the present invention.

FIG. 2 presents a flowchart illustrating the process of camouflaging business-activity information in a telemetry metric by reducing serial correlation in the associated time series in accordance with an embodiment of the present invention. During operation, the system monitors a telemetry signal from the computer system to obtain a time series containing a telemetry metric which provides business-activity information (step 200). Note that the telemetry metric can include, but is not limited to: load on the CPU, I/O traffic, memory utilization, and storage read/write activity. These telemetry metrics are likely to reflect the levels of company's business activities, such as booking, billing, shipping and other transactions. In one embodiment of the present invention, the telemetry signal is directly linked with a telemetry metric, for example, the load on the CPU can be directly measured from the CPU. In another embodiment of the present invention, the telemetry signal is indirectly associated with a telemetry metric so the telemetry metric can be derived from the time series. For example, by monitoring patterns in the core temperature of the CPU, one may be able to infer the load on the CPU.

Next, the system computes a serial correlation between data values in the time series (step 202). In one embodiment of the present invention, a duration of T seconds of data in the time series is sequentially processed each time, wherein the time T is predetermined to allow real-time signal processing.

More specifically, the system feeds the data values into a randomness test which evaluates the degree of serial correlation between these data values. Note that a higher degree of serial correlation between these data values generally indicates less randomness, or "whiteness" in the associated time series. In one embodiment of the present invention, the randomness test is a Fisher-Kappa whiteness test, which is a standard time series statistical test to evaluate the degree of deterministic serial correlation in the time series vs. the degree of randomness.

The system then determines if the degree of serial correlation between data values meets a minimum randomness/whiteness threshold (step 204). For example, this predetermined threshold can be set to 95% confidence interval on randomness based on the result of the Fisher-Kappa whiteness test.

Next, if the telemetry time series does not meet the randomness requirement, the system generates artificial load associated with the telemetry metric on the computer system which causes the randomness in the time series to increase to the threshold level (step 206).

Figure 3:
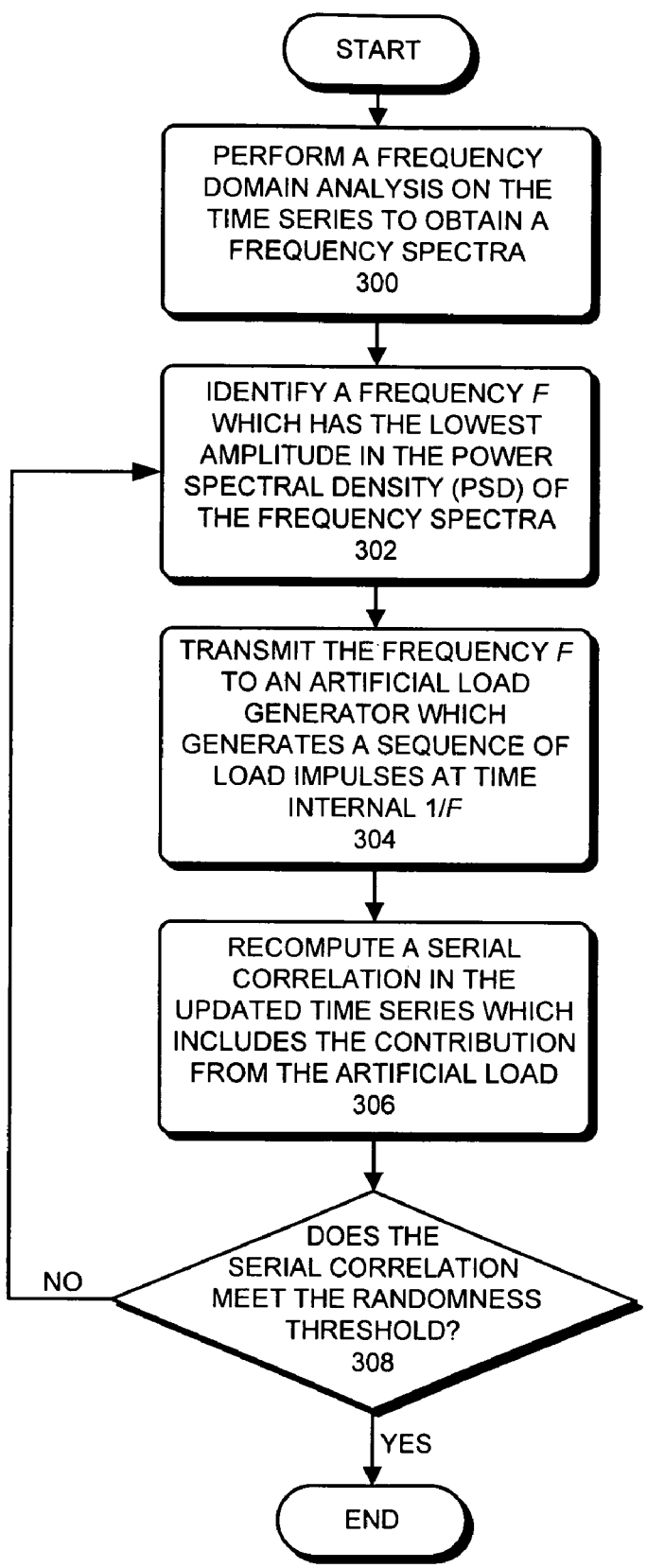
FIG. 3 presents a flowchart illustrating the process of generating artificial load associated with the telemetry metric to randomize data values in the time series in accordance with an embodiment of the present invention.

FIG. 3 presents a flowchart illustrating the process of generating artificial load associated with the telemetry metric to randomize data values in the time series in accordance with an embodiment of the present invention.

During operation, the system first performs a frequency domain analysis on the time series to obtain associated frequency spectra (step 300). In one embodiment of the present invention, the frequency domain analysis is a Fast Fourier Transform (FFT).

Next, the system performs an iterative procedure on the frequency spectra of the time series. Specifically, in each iteration, the system first identifies a frequency F which has the lowest amplitude in the power spectral density (PSD) of the frequency spectra (step 302).

The system then transmits the frequency F associated with the lowest PSD amplitude to an artificial activity generator, which subsequently generates artificial load associated with the frequency F (step 304). In one embodiment of the present invention, the artificial activity generator is a load impulse generator. Specifically, this load impulse generator generates a sequence of narrow load impulses at frequency F, i.e. at a time interval of 1/F seconds, which has the effect of increasing the amplitude of the frequency F term in the PSD.

In one embodiment of the present invention, the sequence of narrow load impulses at frequency F can be generated in a feedback and control loop. Specifically, after a new load impulse is generated, the amplitude of the frequency F is recomputed, and the new amplitude is compared with a threshold value. If the new amplitude is lower than the threshold value, another load impulse is generated at the precise time. Otherwise, the system finishes generating the sequence of narrow load impulses for the frequency F.

After generating the sequence of the load impulses for the frequency F, the system recomputes the serial correlation in the time series which now includes the contribution from the load impulses (step 306). The system then determines if the recomputed serial correlation meets the randomness requirement (step 308).

If so, the data values in the time series is sufficiently "white" which camouflages the business-activity information in the associated telemetry signal. Hence, the iterative procedure in the frequency domain from step 302 to step 308 is complete.

Otherwise, the iterative procedure returns to step 302 wherein the system identifies a new frequency F which has the lowest amplitude in the PSD, and subsequently repeats steps 304-308.

After a number of iterations through this iterative procedure, sequences of timed impulses are generated at precise times to "fill in" the lowest points in the PSD for the telemetry time series, and produces an increasingly more uniform PSD. Note that a uniform PSD in the frequency domain corresponds to a "white noise" time series (i.e., the "power" of the spectrum is spread uniformly across the frequency range).

In one embodiment of the present invention, the frequencies being used to generate the load impulses are held in a first-in first-out (FIFO) buffer which has a predetermined buffer size. Specifically, during each pass of the iterative procedure, the newly identified frequency F is stored in the FIFO buffer. Next, the system generates the new load impulses for only those frequencies found in the FIFO buffer.

Note that the FIFO buffer can become full before the iterative procedure finishes randomizing the time series. When the FIFO buffer is full, each time a new frequency gets added to the FIFO buffer, the oldest frequency is dropped, and all processes associated with the removed frequency are terminated. This gradual updating of the frequencies held in the FIFO buffer facilitates accommodating the possibility that the customer's machine telemetry dynamics may change over time. Also note that having a limited size FIFO buffer prevents the iterative procedure from generating new loads for too many frequency components, which would consume significantly more energy.

Note that there is a tradeoff between the present invention, which randomizes the time series of the telemetry metric with "fill-in" load impulses, and a related invention (described in the above-referenced related application), which "saturates" the load with low-priority exerciser activity. The randomization technique involves more computational cost for the real-time telemetry analysis and a relatively more-complex software implementation. On the other hand, the randomization technique consumes significantly less overall energy than is required for the related invention, because the related invention maintains load at a high (but constant) value all the time.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for camouflaging business-activity information in telemetry signals from a computer system, comprising:
   monitoring telemetry signals from the computer system to obtain a time series containing a telemetry metric which provides business-activity information;
   computing a serial correlation between data values in the time series; and
   if the computed serial correlation between the data values in the time series is above a predetermined threshold level,
      performing frequency domain analysis on the time series; and
      generating artificial activity on the computer system which causes the frequency spectra of the time series to reduce the serial correlation between the data values in the time series.

2. The method of claim 1, wherein the telemetry metric can include:
   load on a CPU;
   I/O traffic;
   memory utilization; and
   storage read/write activity.

3. The method of claim 1, wherein generating the artificial activity involves iteratively:
   identifying a frequency F which has the lowest amplitude in the power spectral density (PSD) of the frequency spectra;
   generating an artificial load in the computer system associated with the frequency F to reduce the serial correlation;
   recomputing the serial correlation;
   determining if the recomputed serial correlation is below the predetermined threshold level; and
   if so, repeating the process for another frequency F which has the lowest amplitude in the PSD.

4. The method of claim 3, wherein generating the artificial load associated with the frequency F involves generating a series of load impulses at a time interval of 1/F, which causes the amplitude of the frequency F in the PSD to increase to a predetermined constant level.

5. The method of claim 3, wherein prior to generating the artificial load in the computer system, the method further comprises storing the frequency F in a first-in first-out (FIFO) buffer which has a predetermined buffer size.

6. The method of claim 5, wherein prior to storing the frequency F in the FIFO buffer, the method further comprises:
   determining if the FIFO buffer is full; and
   if so, removing the oldest frequency from the FIFO buffer, thereby making a space for the frequency F.

7. The method of claim 1, wherein computing the serial correlation involves performing a Fisher-Kappa test, which computes the randomness of the time series.

8. A computer-readable storage medium storing instructions that when executed by a computer cause the computer to perform a method for camouflaging business-activity information in telemetry signals from a computer system, the method comprising:
   monitoring telemetry signals from the computer system to obtain a time series containing a telemetry metric which provides business-activity information;
   computing a serial correlation between data values in the time series; and
   if the computed serial correlation between the data values in the time series is above a predetermined threshold level,
      performing frequency domain analysis on the time series; and
      generating artificial activity on the computer system which causes the frequency spectra of the time series to reduce the serial correlation between the data values in the time series.

9. The computer-readable storage medium of claim 8, wherein the telemetry metric can include:
   load on a CPU;
   I/O traffic;
   memory utilization; and
   storage read/write activity.

10. The computer-readable storage medium of claim 8, wherein generating the artificial activity involves iteratively:
   identifying a frequency F which has the lowest amplitude in the power spectral density (PSD) of the frequency spectra;
   generating an artificial load in the computer system associated with the frequency F to reduce the serial correlation;
   recomputing the serial correlation;
   determining if the recomputed serial correlation is below the predetermined threshold level; and
   if so, repeating the process for another frequency F which has the lowest amplitude in the PSD.

11. The computer-readable storage medium of claim 10, wherein generating the artificial load associated with the frequency F involves generating a series of load impulses at a time interval of 1/F, which causes the amplitude of the frequency F in the PSD to increase to a predetermined constant level.

12. The computer-readable storage medium of claim 10, wherein prior to generating the artificial load in the computer system, the method further comprises storing the frequency F in a first-in first-out (FIFO) buffer which has a predetermined buffer size.

13. The computer-readable storage medium of claim 12, wherein prior to storing the frequency F in the FIFO buffer, the method further comprises:
   determining if the FIFO buffer is full; and
   if so, removing the oldest frequency from the FIFO buffer, thereby making a space for the frequency F.

14. The computer-readable storage medium of claim 8, wherein computing the serial correlation involves performing a Fisher-Kappa test, which computes the randomness of the time series.

15. An apparatus that camouflages business-activity information in telemetry signals from a computer system, comprising:
   a monitoring mechanism configured to monitor telemetry signals from the computer system to obtain a time series containing a telemetry metric which provides business-activity information;
   a computing mechanism configured to compute a serial correlation between data values in the time series;
   wherein the computing mechanism is further configured to perform frequency domain analysis on the time series when the computed serial correlation between the data values in the time series is above a predetermined threshold level; and
   a generating mechanism configured to generate artificial activity on the computer system which causes the frequency spectra of the time series to reduce the serial correlation between the data values in the time series.

16. The apparatus of claim 15, wherein the telemetry metric can include:
- load on a CPU;
- I/O traffic;
- memory utilization; and
- storage read/write activity.

17. The apparatus of claim 15, wherein the generating mechanism is further configured to iteratively:
- identify a frequency F which has the lowest amplitude in the power spectral density (PSD) of the frequency spectra;
- generate an artificial load in the computer system associated with the frequency F to reduce the serial correlation;
- recompute the serial correlation;
- determine if the recomputed serial correlation is below the predetermined threshold level; and
- if so, to repeat the process for another frequency F which has the lowest amplitude in the PSD.

18. The apparatus of claim 17, wherein the generating mechanism is configured to generate the artificial load associated with the frequency F by generating a series of load impulses at a time interval of 1/F, which causes the amplitude of the frequency F in the PSD to increase to a predetermined constant level.

19. The apparatus of claim 17, wherein the generating mechanism is further configured to store the frequency F in a first-in first-out (FIFO) buffer which has a predetermined buffer size.

20. The apparatus of claim 19, wherein while storing the frequency F in the FIFO buffer, the generating mechanism is configured to:
- determine if the FIFO buffer is full; and
- if so, to remove the oldest frequency from the FIFO buffer, thereby making a space for the frequency F.

21. The apparatus of claim 15, wherein the computing mechanism is configured to compute the serial correlation by performing a Fisher-Kappa test, which computes the randomness of the time series.

\* \* \* \* \*